(12) United States Patent
Ito et al.

(10) Patent No.: US 7,725,931 B2
(45) Date of Patent: May 25, 2010

(54) COMMUNICATIONS SYSTEM WITH SECURITY CHECKING FUNCTIONS FOR FILE TRANSFER OPERATION

(75) Inventors: Yuji Ito, Fukuoka (JP); Shinichi Kuranari, Fukuoka (JP); Hironori Ochiai, Fukuoka (JP); Masaya Oda, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 1057 days.

(21) Appl. No.: 11/366,658

(22) Filed: Mar. 2, 2006

(65) Prior Publication Data
US 2007/0079365 A1 Apr. 5, 2007

(30) Foreign Application Priority Data
Sep. 28, 2005 (JP) .............................. 2005-282383

(51) Int. Cl.
G06F 9/00 (2006.01)
(52) U.S. Cl. ........................... 726/11; 713/154; 726/12; 726/13
(58) Field of Classification Search ................. 709/230, 709/233, 236; 726/11–13; 713/154
See application file for complete search history.

(56) References Cited

U.S. PATENT DOCUMENTS

| | | | | |
|---|---|---|---|---|
| 5,606,668 A | * | 2/1997 | Shwed | ........................ 726/13 |
| 5,968,176 A | * | 10/1999 | Nessett et al. | .................. 726/11 |
| 6,158,008 A | * | 12/2000 | Maria et al. | .................... 726/13 |
| 6,230,271 B1 | * | 5/2001 | Wadlow et al. | ................. 726/1 |
| 6,279,153 B1 | * | 8/2001 | Bi et al. | ........................ 717/171 |
| 6,484,261 B1 | * | 11/2002 | Wiegel | ......................... 726/11 |
| 6,778,528 B1 | * | 8/2004 | Blair et al. | .................... 370/352 |
| 6,865,739 B1 | * | 3/2005 | Bourgeois, III | .............. 718/101 |
| 2004/0030770 A1 | * | 2/2004 | Pandya | ........................ 709/223 |
| 2004/0162913 A1 | * | 8/2004 | Halahmi et al. | ............. 709/236 |

FOREIGN PATENT DOCUMENTS

JP 2003-173284 6/2003

* cited by examiner

*Primary Examiner*—Taghi T Arani
*Assistant Examiner*—Justin T Darrow
(74) *Attorney, Agent, or Firm*—Fujitsu Patent Center

(57) ABSTRACT

A secure data communications system with an enhanced function of preventing information leakage. The system includes a user terminal and a router. The router has a security condition definition unit and a storage unit to receive and store a set of security conditions. A packet parser identifies and parses a packet produced by a file transfer application protocol and extracts from that packet a destination address and a security condition ID that the sending user has specified for a file in the packet. The packet parser discards the packet to prevent information leakage if the extracted destination address does not satisfy the security condition corresponding to the user-specified security condition ID. The user terminal has a security condition user interface that requests the router to provide information about security conditions and gives a security condition ID to each file to indicate which security condition the sending user has specified.

11 Claims, 12 Drawing Sheets

| DEPARTMENT | SEGMENT ASSIGNED |
|---|---|
| Development Dept | SEGMENT A, B |
| Testing Dept | SEGMENT C |
| Assessment Dept | SEGMENT D |

FIG. 7

| MEMBER ADDRESS | DEPARTMENT |
|---|---|
| aaa@ml.fujitsu.com | Customer Support Dept |
| bbb@ml.fujitsu.com | Customer Support Dept |
| ccc@ml.fujitsu.com | Customer Support Dept |
| ddd@ml.fujitsu.com | Development Dept |
| eee@ml.fujitsu.com | Testing Dept |

Return-Path:

Received:

Date:

From:

Reply-To:

Subject:

To:

Message-Id:

X-ML-Name: ⎫
X-Mail-Count: ⎪
X-MLServer: ⎪
X-ML-Info: ⎪
X-Mailer: ⎬ X-field: Header field that the user can add as necessary
X-Priority: ⎪
X-MSMail-Priority: ⎪
X-MIMEOLE: ⎪
X-SecurityID: ⎭

Mime-Version:

Content-Type:

COMMUNICATIONS SYSTEM WITH
SECURITY CHECKING FUNCTIONS FOR
FILE TRANSFER OPERATION

CROSS-REFERENCE TO RELATED APPLICATIONS

This application is based upon and claims the benefits of priority from the prior Japanese Patent Application No. 2005-282383, filed on Sep. 28, 2005, the entire contents of which are incorporated herein by reference.

BACKGROUND OF THE INVENTION

1. Field of the Invention

The present invention relates to communications systems, and more particularly to a communications system that transfers packets containing business-related files over an enterprise network or other network using the Internet Protocol (IP).

2. Description of the Related Art

Users of an enterprise local-area network (LAN) or a similar IP network often encounter a situation where they need to send files to one or more colleagues of theirs for the purpose of business activities. To achieve this, they use email attachment encoded in the Multipurpose Internet Mail Extension (MIME) format. Other typical applications and protocols used for file transfer purposes are: the Direct Client-to-Client (DCC) function of Internet Relay Chat (IRC), File Transfer Protocol (FTP), and Hyper Text Transfer Protocol (HTTP).

Document and data files transferred over an enterprise network often contain company-confidential information, which must be protected from being viewed by third parties, or even by other staffs in the same company, to prevent the information from leaking out. The network manager of the company is responsible for establishing a system for controlling access to such confidential files.

A typical method to implement restricted file access is to use an authentication mechanism of file servers. Specifically, a password is set in a server accommodating uploaded files. This password is only known by a concerned party, thus protecting those files from unauthorized access.

The above protection method using an authentication mechanism, however, cannot avoid a possibility that the sender of a file mistakenly sends that file as an email attachment directly to a wrong destination. Another possibility that cannot be avoided by the conventional method is that the sender accidentally uploads files to a wrong file server where the destination file directory is not password protected. Those possible human errors would lead to an information leakage problem.

Firewall servers may be used to avoid a wrong file transfer. This firewall server solution enables or disables file transfer operations in a comprehensive manner, rather than fine tunes the control of file delivery on an individual sender basis, for example. That is, while a firewall server effectively prevents files from being delivered to a party outside of the company, it is not possible to configure the server to restrict file transfers between, for example, particular departments within the same company.

Yet another example of an existing file protection technique is to use a gateway server with a mechanism of checking labels attached to the files to be transmitted to represent their respective confidentiality levels. See, for example, Japanese Patent Application Publication No. 2003-173284, paragraphs Nos. 0014 to 0017 and FIG. 1. The technique disclosed in this publication, however, is not always effective since it does not consider applications where the checking has to act on an individual network segment basis.

SUMMARY OF THE INVENTION

In view of the foregoing, it is an object of the present invention to provide a secure data communications system with an enhanced function of preventing information leakage.

To accomplish the above object, the present invention provides a communications system for transferring packets. This communications system has a security condition definition unit and a security condition database to receive and store a set of security conditions. The system also has a packet parser that identifies and parses a packet produced by a file transfer application protocol, in order to extract therefrom a destination address and a security condition identifier (ID) that a sending user has specified for a file contained in the packet. The packet parser determines whether the extracted destination address satisfies the security condition corresponding to the user-specified security condition ID and, if it does not satisfy, discards the packet to prevent information leakage. The above elements are implemented in a router coupled to a sending user terminal. Provided in the user terminal is a security condition user interface. This security condition user interface requests the router to provide information about security conditions and gives a security condition ID to an outgoing file to indicate which security condition the sending user has specified.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 7 shows an example mapping between segments and departments.

FIG. 9 shows an example mapping between member email addresses and departments.

FIG. 12 shows an email header.

DESCRIPTION OF THE PREFERRED EMBODIMENTS

Figure 1:
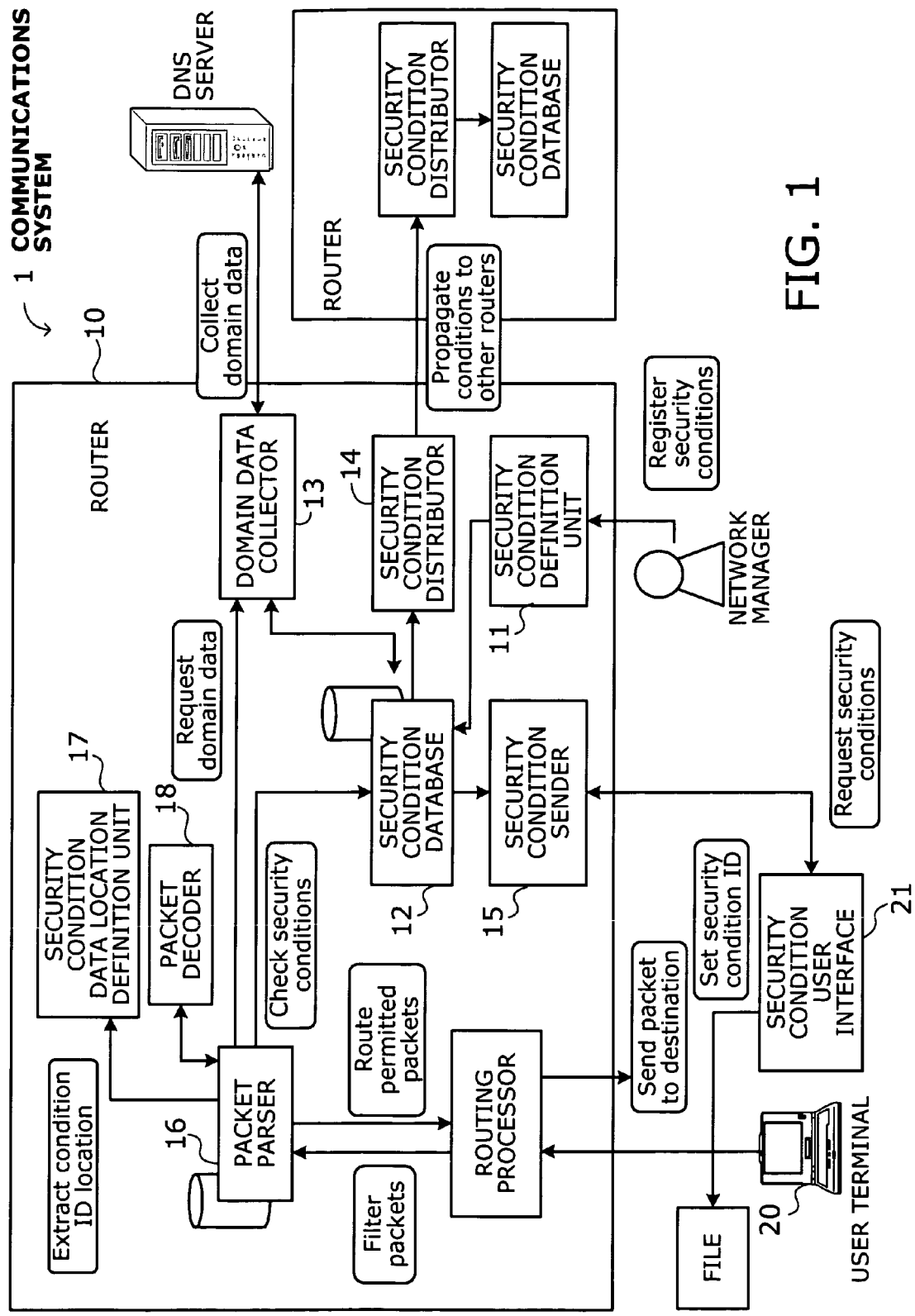
FIG. 1 is a conceptual view of a communications system according to the present invention.

Preferred embodiments of the present invention will be described below with reference to the accompanying drawings, wherein like reference numerals refer to like elements throughout.

FIG. 1 is a conceptual view of a communications system according to the present invention. This communications system 1 includes a router 10 and a user terminal 20, allowing the user sitting at the user terminal 20 to send a file to another user via the router 10. The communications system 1 is designed to prevent the information from leaking even if the user has placed a wrong destination address accidentally.

The router 10 is formed from the following elements: a security condition definition unit 11, a security condition database 12, a domain data collector 13, a security condition distributor 14, a security condition sender 15, a packet parser 16, a security condition data location definition unit 17, and a packet decoder 18.

The security condition definition unit 11 receives a set of security conditions defined by a network manager or the like and passes it to the security condition database 12. The security condition database 12 stores those security conditions defined at the security condition definition unit 11. In the case where the security conditions are defined by using domain names, the security condition database 12 consults the domain data collector 13 to collect segment parameters related to each specified domain. The following is a list of data items stored in the security condition database 12:

security condition definition name
    The network manager gives the name of a security condition definition.
security condition ID
    This is a unique ID given by the network automatically when a security condition and its definition name are registered. Router IDs may be added as part of security condition IDs to make them unique.
permissible segment
    The network manager specifies permissible segments corresponding to each security condition definition that he/she creates.

The domain data collector 13 makes access to the domain name system (DNS) server to collect segment parameters of a domain when that domain is specified in given security conditions. The security condition distributor 14 notifies other routers of the content of a new security condition when it is added to the security condition database 12. The security condition sender 15 provides the sending user, upon his/her request, with what security conditions are stored in the security condition database 12.

The packet parser 16 identifies and parses a packet produced by a file transfer application protocol, thereby extracting therefrom a destination address and a security condition that the sending user has given to a file contained in that packet. After that, the packet parser 16 consults the security condition database 12 to determine whether the extracted destination address satisfies the specified security condition.

The security condition data location definition unit 17 maintains information for use in extracting a security condition ID from a given outgoing file packet.

The packet decoder 18 decodes a file attachment of an email message received from a user, where the attached file is compressed in an appropriate data compression format, with an extended field containing a security condition ID specified by the user.

The user terminal 20 is a device from which the user transmits files. The user terminal 20 has a security condition user interface 21 to provide the following functions:
    The security condition user interface 21 requests the router 10 to provide information about security conditions, including a format for setting security conditions, security condition definition names, and security condition IDs.

Upon receipt of a security condition definition specified by the user, the security condition user interface 21 sets a security condition ID according to the given format.

First Embodiment

Figure 2:
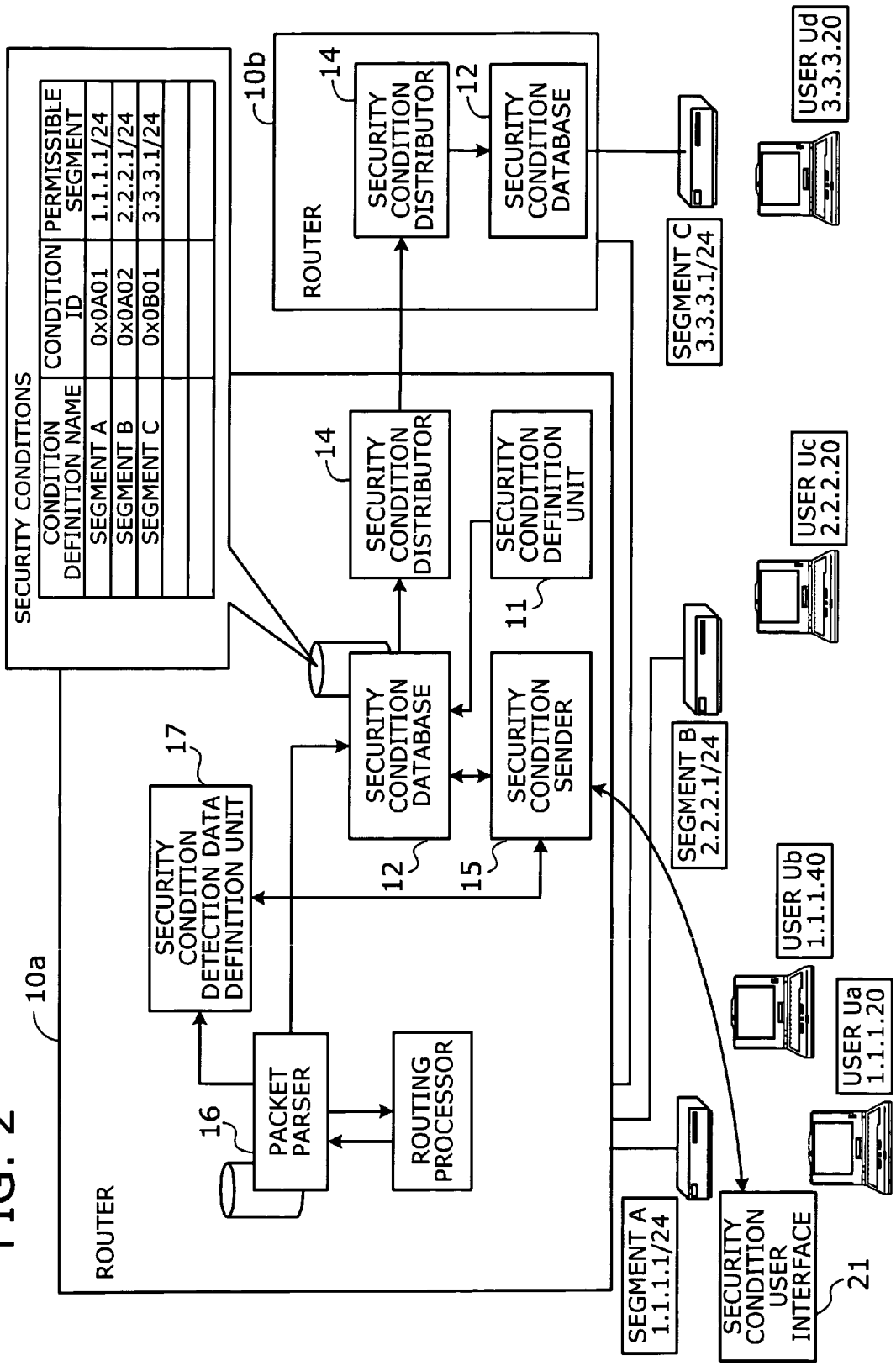
FIG. 2 shows a network configuration according to a first embodiment of the invention.
Figure 3:
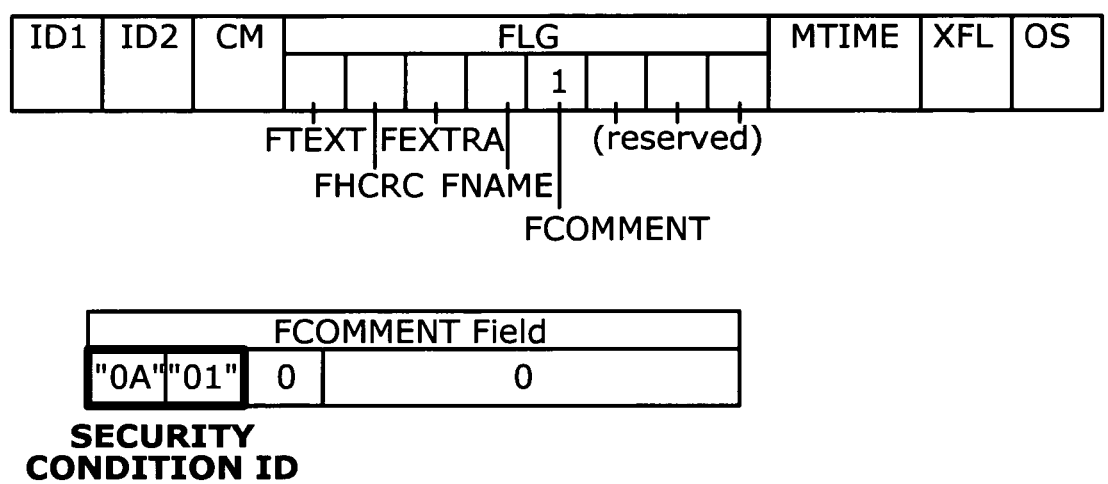
FIG. 3 shows the location of a security condition ID.
Figure 4:
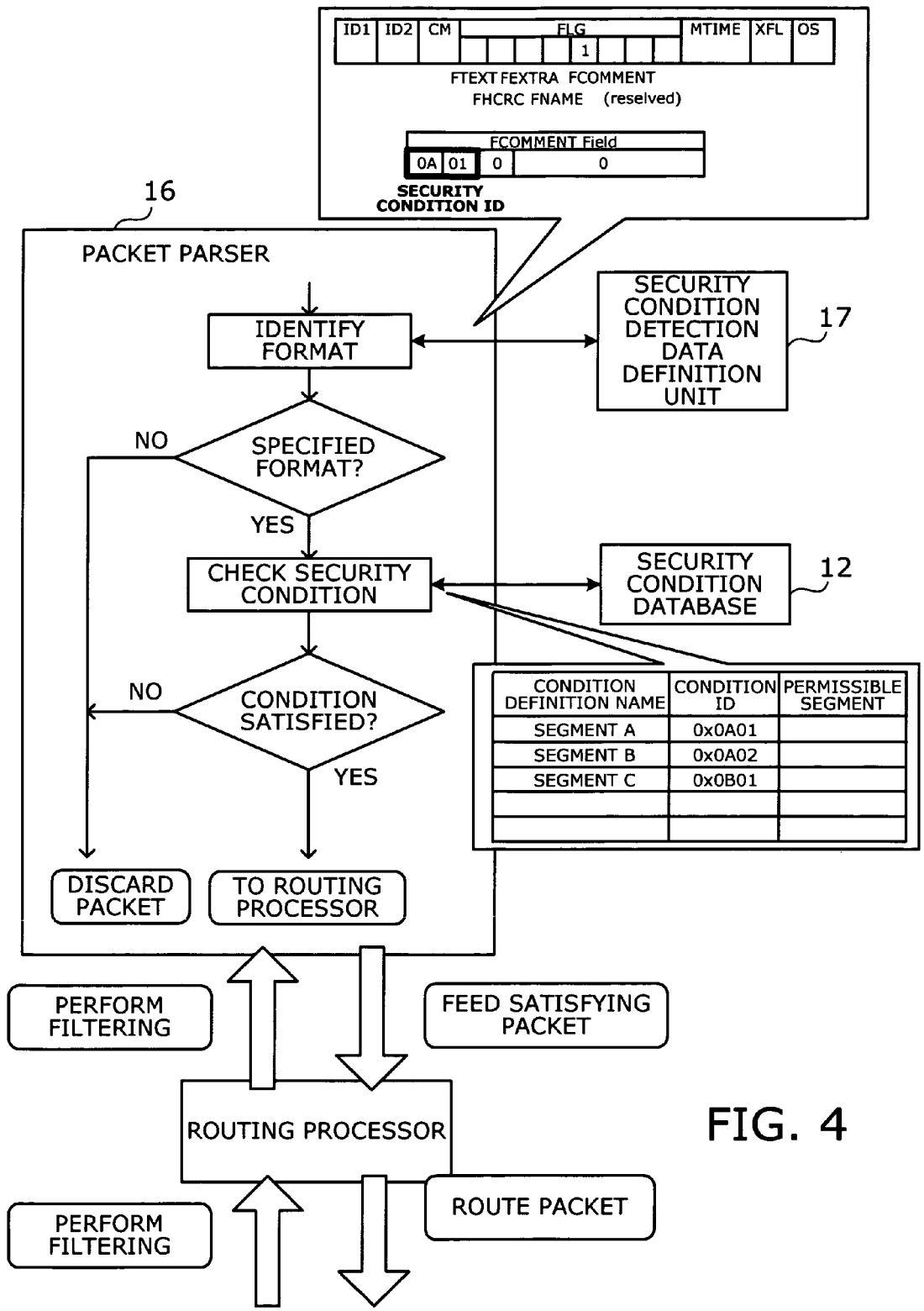
FIG. 4 gives an overview of how a packet parser operates in the first embodiment.

Referring now to FIGS. 2 to 4, this section will describe the operation of the router 10 according to a first embodiment of the invention.

FIG. 2 shows an example configuration of an enterprise LAN that is segmented by a plurality of routers 10 with file transmission checking functions. In the example shown in FIG. 2, two routers 10a and 10b divide the network into three segments A, B, and C. Segment A accommodates two terminals of two users Ua and Ub. Likewise, segment B accommodates another user Uc, and segment C accommodates yet another user Ud. It is assumed, for illustration, that the users Ua and Ub are involved in the same project, while the other users Uc and Ud are involved in other projects.

(1) Security Condition Setting

The network manager is supposed to establish security conditions beforehand such that files can be transferred across network segments in a controlled way. In the present case, the network manager defines a set of security conditions for files destined for segments A, B, and C. Specifically, he/she configures the router 10a with two security conditions that permit a file transfer to segments A and B, respectively. The router 10a accepts these security conditions at its security condition definition unit 11, and the information is passed to the security condition database 12.

The above registration process involves assignment of a unique security condition ID to each given condition. Since security condition IDs have to be unique throughout the network, the security condition definition unit 11 creates them by, for example, combining the router ID of the router 10 and serial numbers. The illustrated router 10a has its own router ID "0A" and creates two successive security condition IDs "0A01" and "0A02" by adding two-digit serial numbers to that router ID.

After sending those security conditions to the security condition database 12, the security condition definition unit 11 supplies them to the security condition distributor 14. The security condition distributor 14 forwards the information to the next router 10b. In the receiving router 10b, another security condition distributor 14 saves the received security conditions in its local security condition database 12. Likewise, security conditions for segment C are set in the router 10b and then delivered to the router 10a for registration.

(2) Security Condition Selection at User Terminal

It is now assumed that the user Ua is to send a project-related file to his/her colleague, user Ub, by using FTP. Before transmitting the file, the user Ua interacts with the security condition user interface 21 to specify a desired security condition. To perform this interaction, the security condition user interface 21 first requests the router 10a to provide information about what security conditions the network allows.

Upon receipt of the above request, the security condition sender 15 in the router 10a retrieves security condition definition names and security condition IDs from the security condition database 12, as well as consulting the security condition data location definition unit 17 to obtain the information about in what format security data should be stored. The security condition sender 15 sends the retrieved information to the security condition user interface 21 in the requesting user terminal. In the present example, the registered security conditions are named as: "segment A," "segment B," and "segment C." The security condition database 12 sends the definition names and IDs of those conditions.

With the received information, the security condition user interface 21 in the requesting user terminal prompts the user to select his/her desired security condition. In the present context, the user selects "segment A" since the destination user Ub is in segment A. Upon selection, the security condition user interface 21 sets the selected security condition "segment A" by attaching its ID "0x0A01" to the file.

FIG. 3 shows the location of a security condition ID. As an example implementation, the security condition ID is stored in a part of FCOMMENT field of a gzip file, where gzip is one of the commonly available file compression utilities. FCOMMENT field is an extended field, which is rarely used. Another possible implementation is to append a file containing a security condition ID to an archive file compressed in, for example, the LHA format. The resulting packet with a security condition ID is sent from the sending user terminal to the router 10a.

(3) Processing in Router

The FTP packet received by the router 10a is passed to the routing processor, so that it will be delivered to the destination according to the routing information. The routing processor, however, has previously been configured with filtering parameters. This packet filtering permits the received FTP packet to be directed to the packet parser 16.

FIG. 4 gives an overview of how the packet parser 16 operates. As FIG. 4 shows, the packet parser 16 first consults the security condition data location definition unit 17 to identify the file format of the given IP packet, thus figuring out the location of a security condition ID in that packet. If it is unable to find the format taught by the security condition data location definition unit 17, the packet parser 16 returns the packet to the routing processor, so that the packet will be forwarded to the specified destination IP address.

If the packet in question has an expected format, the packet parser 16 extracts a security condition ID and destination information from the packet. In the present example, the packet parser 16 finds that the file has a security condition ID of "0x0A01" and is destined for the IP address "1.1.1.40." After that, the packet parser 16 consults the security condition database 12 to determine whether the extracted packet destination satisfies the specified security condition.

The relevant entry of the security condition database 12 indicates that the security condition "0x0A01" is applicable in segment "1.1.1.1/24." This segment, or a range of IP address, includes the destination IP address "1.1.1.40" of the file. This means that the file can be delivered to that segment. The packet parser 16 thus sends the packet back to the routing processor for delivery to its destination. The destination user Ub receives the file through the router 10a. He/she can decompress the received file by using a commonly available archiver application.

The packet parser 16 discards a given packet if that packet has a wrong destination address. Suppose, for example, that the sending user Ua has mistakenly specified user Uc, instead of the intended user Ub, as a destination. This mistake produces a packet with a destination IP address of "2.2.2.20." The packet parser 16 consults the security condition data location definition unit 17 to identify the file format of the packet. If the packet in question has an expected format, the packet parser 16 extracts a security condition ID and a destination parameter from the packet. In the present example, the packet parser 16 finds a security condition ID of "0x0A01," as well as figuring out that the file is destined for the IP address "2.2.2.20."

The relevant record in the security condition database 12 indicates that the security conditions "0x0A01" limits the delivery of files to a segment "1.1.1.1/24." The specified destination IP address "2.2.2.20" is out of the segment, meaning that the packet must not be delivered to the specified destination. The packet parser 16 therefore discards the packet.

Operation of First Embodiment

This section summarizes the operation of the first embodiment. The network manager configures a router 10a with security conditions specifying segments to which files can be transferred. Those security conditions are registered with the security condition database 12 through the security condition definition unit 11. After sending the security conditions to the security condition database 12, the security condition definition unit 11 also delivers them to the security condition distributor 14.

The security condition distributor 14 forwards the registered security data to other routers on the network. The security condition distributor 14 in the receiving router saves the received security conditions in its local security condition database 12.

When a user attempts to send a file to his/her colleague, the security condition user interface 21 of his/her terminal retrieves a list of security conditions from the attached router before placing the file on the network. Upon receipt of this user request, the security condition sender 15 in the router 10a retrieves information about security conditions from the security condition database 12 and security condition data location definition unit 17. The retrieved information is then sent back to the security condition user interface 21 of the requesting user terminal. With a security condition selected by the user, the security condition user interface 21 adds a particular security condition ID to the file to be transmitted.

Now that the security condition user interface 21 has set a security condition, the user is allowed to initiate a file transfer. The routing processor in the router 10a has previously been configured with appropriate filtering parameters. This packet filtering permits FTP packets to be directed to the packet parser 16. The packet parser 16 first consults the security condition data location definition unit 17 to figure out the location of a security condition ID in the given IP packet. Then the packet parser 16 extracts that security condition ID and destination IP address from the packet.

The packet parser 16 now consults the security condition database 12 to determine whether the destination IP address satisfies the specified security condition. If so, the packet is sent back to the routing processor for routing to the destination. If the sending user mistakenly specified a third party destination, the packet would be discarded since the security condition rejects its destination IP address. The first embodiment of the present invention thus prevents the file from being delivered to unintended destinations.

As can be seen from the above explanation, the first embodiment of the present invention prevents information from leaking due to human error. It is unavoidable for enterprise LAN users to set a wrong destination address when they send files. While conventional server authentication systems are unable to find this kind of human errors and thus would allow a file to be delivered to an unintended third party, the first embodiment of the invention provides protection by employing a checking mechanism in each router and setting security conditions for segment-based protection. Since the protection is implemented in routers, it is possible to fine tune a checking mechanism for file transfer sessions.

Second Embodiment

Figure 5:
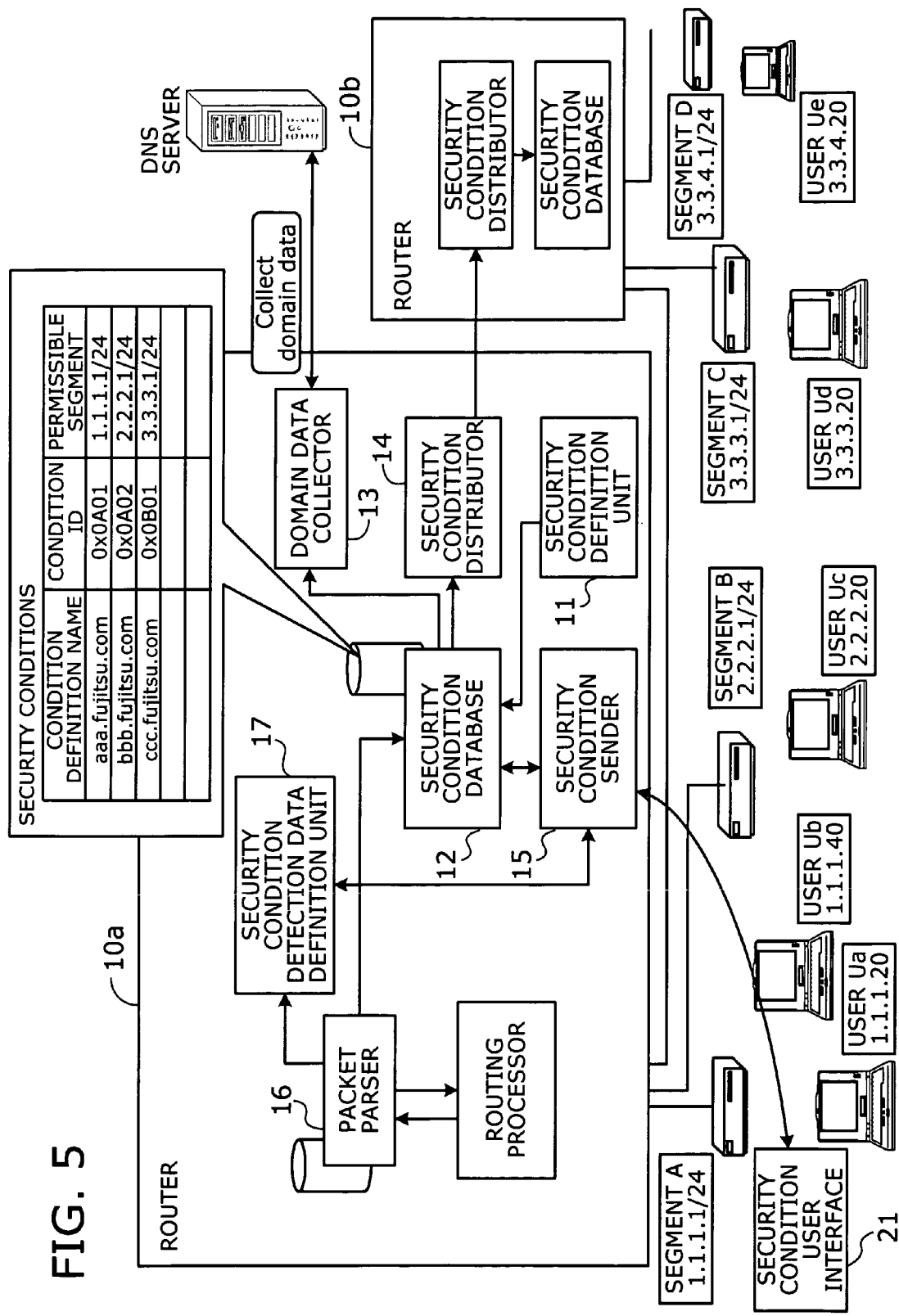
FIG. 5 shows an example network configuration according to a second embodiment of the invention.

Referring to a network diagram of FIG. 5, this section will explain a router 10 according to a second embodiment of the invention. FIG. 5 shows an example configuration of an enterprise LAN that is formed from a plurality of segments interconnected by routers. Specifically, two routers 10a and 10b divide the network into four segments A, B, C, and D.

Segment A accommodates two terminals serving users Ua and Ub. Likewise, segment B accommodates another user Uc, and segment C accommodates yet another user Ud. Segment D accommodates still another user Ue. Each segment is assigned a particular domain name. Specifically, segment A has a domain name "aaa.fujitsu.com" while segment B has a different domain name "bbb.fujitsu.com." Likewise, segment C and segment D correspond to "ccc.fujitsu.com."

(1) Security Condition Setting

The network manager is supposed to set security conditions on an individual domain basis. More specifically, the network manager configures a router 10a to allow a file transfer to "aaa.fujitsu.com" and "bbb.fujitsu.com." The router 10a accepts those security conditions at its security condition definition unit 11, and that information is passed to the security condition database 12. After sending the security conditions to the security condition database 12, the security condition definition unit 11 delivers them to the security condition distributor 14.

The security condition distributor 14 provides the registered security data to the next router 10b. The security condition distributor 14 in the receiving router 10b saves the received security conditions in the security condition database 12. Similarly to the above, security conditions for a definition name "ccc.fujitsu.com" are defined in the router 10b and then delivered to the router 10a for registration.

(2) Security Condition Selection at User Terminal

It is now assumed that one user Ua is to send a file to another user Ub by using FTP. Before transmitting the file, the sending user Ua interacts with the security condition user interface 21 to specify a desired security condition. To perform this interaction, the security condition user interface 21 first requests the router 10a to provide information about what security conditions the network allows.

Upon receipt of the above request, the security condition sender 15 in the router 10a retrieves security condition definition names and security condition IDs from the security condition database 12. The security condition sender 15 also consults the security condition data location definition unit 17 to obtain the information about in what format the security data should be stored. The security condition sender 15 sends the retrieved information to the security condition user interface 21 in the requesting user terminal.

With the received information, the security condition user interface 21 in the requesting user terminal prompts the user to select his/her desired security condition. In the present context, the user selects "ccc.fujitsu.com" since the intended destination user Ud is in the domain "ccc.fujitsu.com." Upon selection, the security condition user interface 21 sets the selected security condition "ccc.fujitsu.com" by attaching its ID "0x0B01" to the file. The resulting packet with a security condition ID "0x0B01" is then sent from the sending user terminal to the router 10a.

(3) Processing in Router

The packet received by the router 10a first goes to the routing processor, so that it will be routed to the intended destination. The routing processor, however, has previously been configured with filtering parameters, which permits the received FTP packet to be directed to the packet parser 16.

Upon receipt of the FTP packet, the packet parser 16 first consults the security condition data location definition unit 17 to find the location of a security condition ID in the given IP packet. That is, the packet parser 16 examines whether the given packet has an expected data structure that can accommodate a security condition ID. The router discards the packet if it does not have such a data structure.

If the packet in question has an expected format, the packet parser 16 extracts a security condition ID and a destination parameter from the packet. Specifically, the packet parser 16 obtains a security condition ID "0x0B01" and a destination IP address "3.3.3.20" in the present case. Then the packet parser 16 consults the security condition database 12 to determine whether the extracted packet destination satisfies the specified security condition.

The relevant entry of the security condition database 12 indicates that the security condition "0x0B01" is applicable in segment "3.3.3.1/24" and that segment includes the destination IP address "3.3.3.20" of the packet. This means that the file can be delivered to that segment. The packet parser 16 thus sends the packet back to the routing processor, permitting delivery to its destination, user Ud. The destination user Ud receives the file through the router 10a. He/she can decompress the received file by using a commonly available archiver application.

If the packet destination fails to satisfy the specified security condition, it means that the router may possibly lack information about some segments corresponding the domain of interest. If this is the case, the router then executes the following task. Suppose, for example, that one user Ua is attempting to send a file to another user Ue who is located in a newly added segment D with a domain name of "ccc.fujitsu.com." The FTP packet carrying this file first reaches the router 10a. Inside the router 10a, the received packet goes to the routing processor and is then forwarded to the packet parser 16.

As FIG. 5 shows, the packet parser 16 first consults the security condition data location definition unit 17 to identify the file format of a given IP packet, thus figuring out the location of a security condition ID in that packet. Upon finding the file format, the packet parser 16 extracts a security condition ID and a destination parameter from the packet. Specifically, the packet parser 16 obtains a security condition ID "0x0B01" and a destination IP address "3.3.4.20" in the present case. Then the packet parser 16 consults the security condition database 12 to determine whether the extracted packet destination satisfies the specified security condition, "ccc.fujitsu.com." Because this security condition does not include segment D as a permissible segment, the packet parser 16 performs the following procedure.

The packet parser 16 notifies the domain data collector 13 of the address of the destination user Ud since the current set of security conditions may not always include every existing segment of a specified domain. The domain data collector 13 uses an inverse DNS service to obtain a domain name corresponding to the given destination address. If this domain name coincides with the one corresponding to the specified security condition ID, the domain data collector 13 registers the segment of interest with the security condition database 12 as an additional piece of domain data. In the present example, segment D accommodating the destination user Ud is added to the security condition with a domain name of "ccc.fujitsu.com." Subsequently the domain data collector 13 notifies the packet parser 16 of the result of comparing domain names, thus enabling the packet parser 16 to use the updated information in the security condition database 12.

When the above-described comparison of domain names indicates that the destination address of the packet in question is permissible, the packet parser 16 sends the packet back to the routing processor, permitting delivery to its destination, user Ue. The destination user Ue receives the file through the router 10a. He/she can decompress the received file by using a commonly available archiver application.

The packet parser 16 discards the packet if that packet has a wrong destination address. Suppose, for example, that the sending user Ua has mistakenly specified user Uc, instead of the intended user Ud, as a destination. This mistake would produce a packet with a destination IP address of "2.2.2.20." The packet parser 16 then consults the security condition data location definition unit 17 to find the location of a security condition ID in the given IP packet. That is, the packet parser 16 examines whether the given packet has an expected data structure that can accommodate a security condition ID.

If the packet in question has an expected format, the packet parser 16 extracts a security condition ID and a destination parameter from that packet. Specifically, the packet parser 16 obtains a security condition ID "0x0B01" and a destination IP address "2.2.2.20" in the present case. The packet parser 16 subsequently consults the security condition database 12. The relevant record in the security condition database 12 indicates that the security conditions "0x0B01" limits the delivery of files to segment "3.3.3.1/24." The specified destination IP address "2.2.2.20" is out of that segment.

The packet parser 16 therefore notifies the domain data collector 13 of the destination IP address. The domain data collector 13 obtains its corresponding domain name "bbb.fujitsu.com" by using an inverse DNS service. Since this domain name does not coincide with the one described in the given security condition, the domain data collector 13 notifies the packet parser 16 of that discrepancy, without modifying the security condition database 12. From this information, the packet parser 16 learns that the specified destination is not allowed to receive the file. The packet parser 16 therefore discards the received packet, without routing it to its destination.

According to the second embodiment, the packet parser 16 checks whether the security condition permits the destination IP address. If so, the packet is sent back to the routing processor for routing to its destination. If not, it still means that the IP address in question may be part of the domain, although it is not registered with the security condition database 12. The packet parser 16 thus sends the IP address to the domain data collector 13.

The domain data collector 13 consults the DNS server to obtain a domain name corresponding to the IP address in question. If the obtained domain name coincides with the one defined in the present security condition, the domain data collector 13 adds the IP address to the existing security condition. The packet should then be routed, and the routing processor is so notified. If, on the other hand, the two domain names disagree with each other, the packet has to be discarded to prevent the file from being delivered to an unintended destination.

As can be seen from the above explanation, the second embodiment of the invention enables a network manager to configure a file transfer checking mechanism by using domain names. Also, the router of the second embodiment is designed to obtain domain parameters corresponding to a given IP address by using inverse DNS. This feature of the proposed router enables security conditions to be automatically updated with new segment parameters of a specified domain.

The first embodiment may not necessarily be efficient in the case where the membership of a network segment varies dynamically, since each segment is specified by an IP address. The second embodiment, on the other hand, works on the basis of domains, or a collection of different segments, which can be designated by abstract character strings. By using DNS functions to specify a domain, the router of the second embodiment eliminates the use of IP addresses to describe a particular segment in the case where the segments in a domain may vary. Besides being more efficient than the first embodiment in such circumstances, the second embodiment can follow the changes in segment structure.

Third Embodiment

Figure 6:
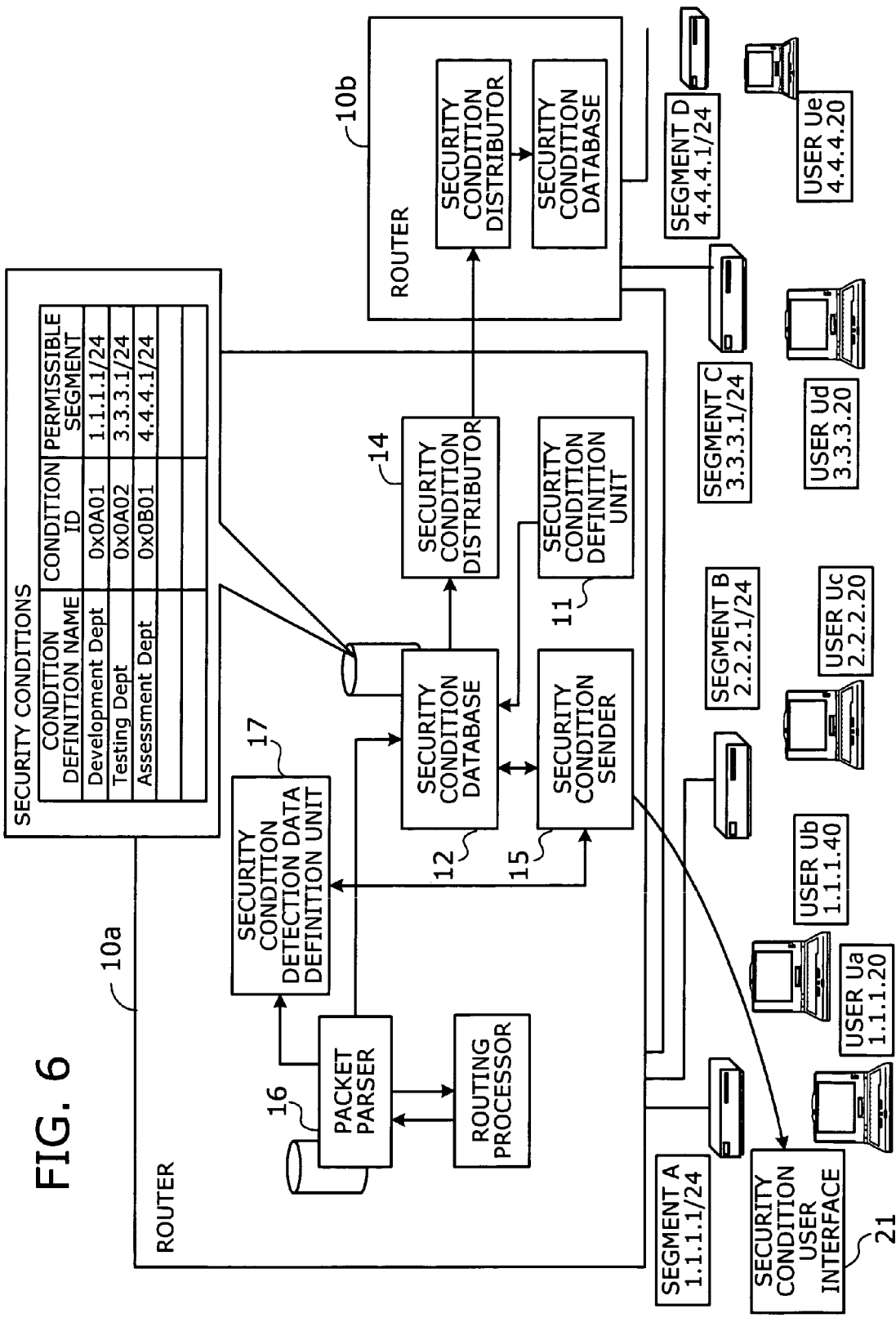
FIG. 6 shows an example network configuration according to a third embodiment of the invention.

This section describes a router 10 according to a third embodiment of the present invention, with reference to FIGS. 6 and 7. FIG. 6 shows an example configuration of an enterprise LAN that is formed from a plurality of segments interconnected by routers. Specifically, two routers 10a and 10b divide the network into four segments A, B, C, and D.

FIG. 7 shows an example mapping between segments and departments. As can be seen, four segments are assigned to three departments. Each department uses a single segment or a group of segments.

(1) Security Condition Setting

The network manager configures the router 10a with three security conditions that permit file transfer to "Development Department (Dept)," "Testing Department," and "Assessment Department," respectively. The router 10a accepts those security conditions at its security condition definition unit 11, and the information is entered to the security condition database 12. After sending the security conditions to the security condition database 12, the security condition definition unit 11 supplies them to the security condition distributor 14.

The security condition distributor 14 provides the registered security data to the next router 10b. The security condition distributor 14 in the receiving router 10b saves the received security conditions in the security condition database 12. Similarly to the above, the router 10b propagates its own security conditions to its neighboring router 10a for registration.

(2) Security Condition Selection at User Terminal

Suppose that a user Ua is to send a file to another user Ub in the same segment. Before transmitting the file, the sending user Ua interacts with the security condition user interface 21 to specify a desired security condition. That is, the security condition user interface 21 first requests the router 10a to provide information about what security conditions the network allows.

Upon receipt of the above request, the security condition sender 15 in the router 10a retrieves security condition definition names and security condition IDs from the security condition database 12. The security condition sender 15 also consults the security condition data location definition unit 17 to obtain the information about in what format the security data should be stored. The security condition sender 15 sends the retrieved information to the security condition user interface 21 in the requesting user terminal.

With the received information, the security condition user interface 21 in the requesting user terminal prompts the user to select his/her desired security condition. In the present context, the sending user Ua selects "Development Department" since the intended destination user Ub in segment A belongs to that department. Upon selection, the security condition user interface 21 sets the selected security condition "Development Department" by attaching its ID "0x0A01" to the file. The resulting packet with a security condition ID "0x0A01" is sent from the sending user terminal to the router 10a.

(3) Processing in Router

The router 10a of the third embodiment operates in the same way as in the first embodiment.

As can be seen from the above explanation, the third embodiment of the invention permits a network manager to establish security conditions that permits the information to be shared only in a particular department or in a particular group of staffs. It is therefore possible to configure the checking function in greater detail.

Fourth Embodiment

Figure 8:
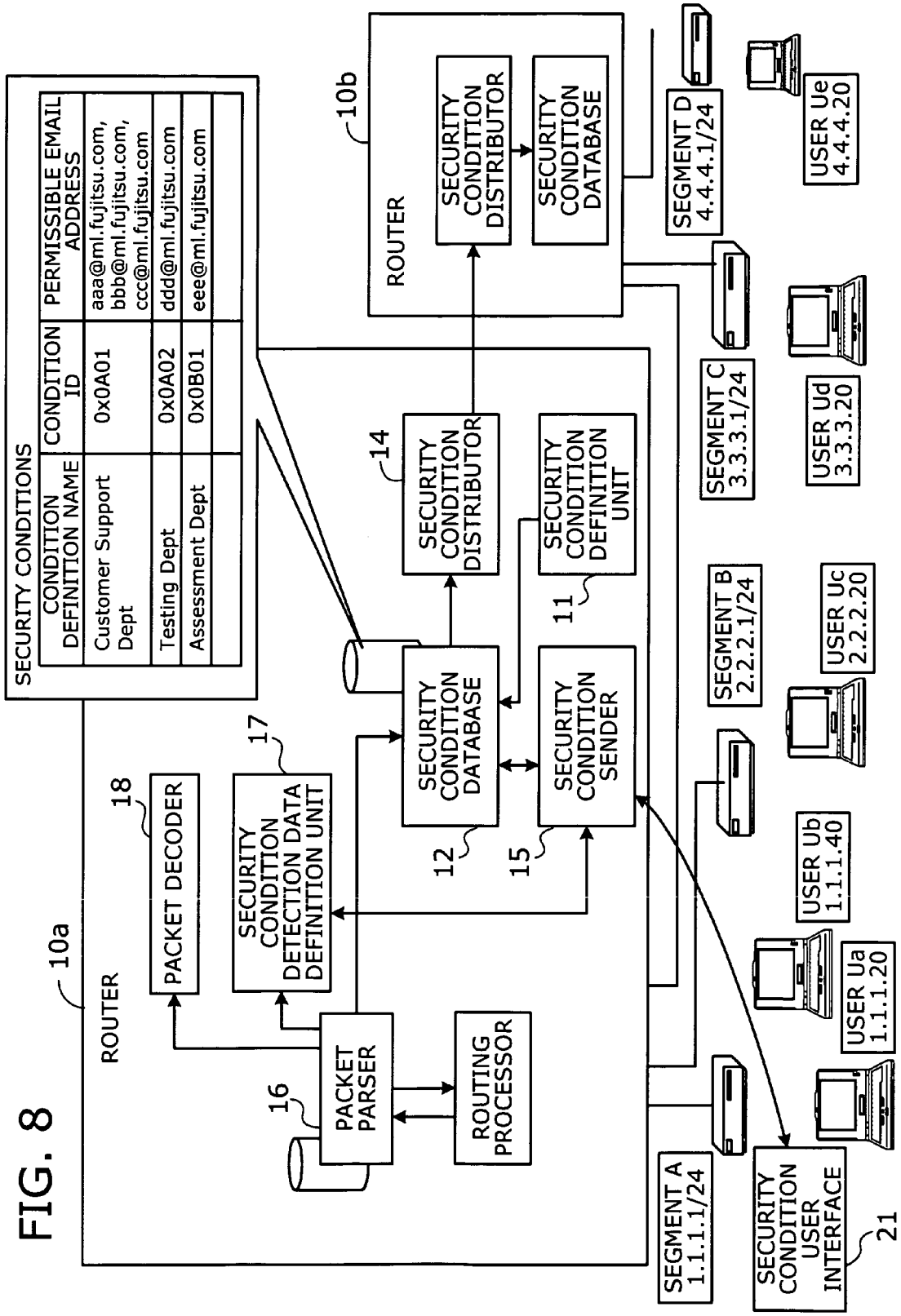
FIG. 8 shows an example network configuration according to a fourth embodiment of the invention.
Figure 10:
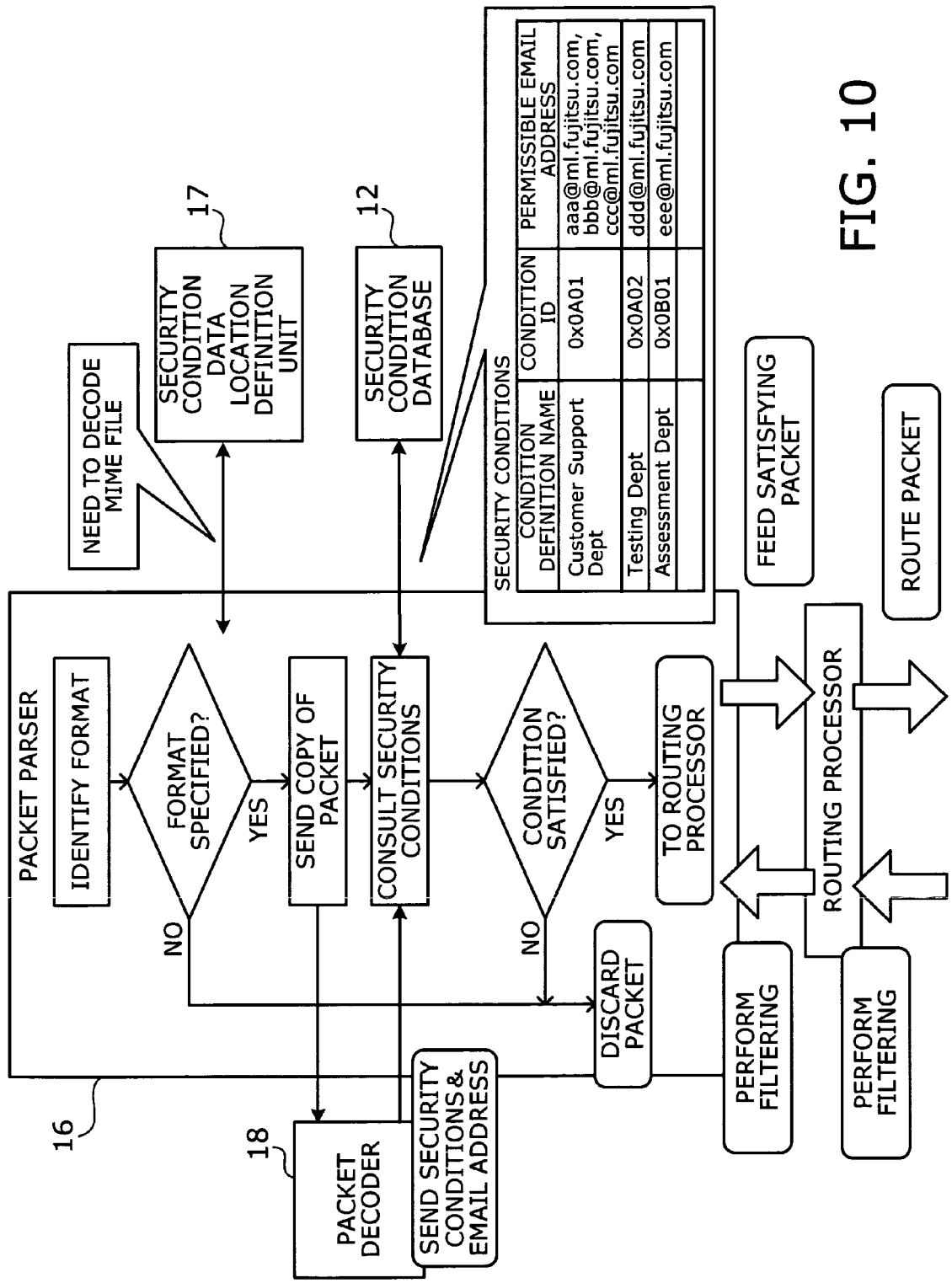
FIG. 10 shows an overview of how an SMTP packet is parsed.

Referring to FIGS. 8 to 10, this section will describe the operation of a router 10 according to a fourth embodiment of the invention. According to this fourth embodiment, a security condition ID is attached to each email message carrying files so as to prevent information leakage on an individual email address basis. To this end, the fourth embodiment uses an extended field of a compressed file format.

FIG. 8 shows an example network configuration. The illustrated enterprise LAN is divided into segments, and those segments are interconnected by routers. Specifically, two routers 10a and 10b divide the network into four segments A, B, C, and D.

FIG. 9 shows an example mapping between departments and email addresses of their respective members. That is, each department member has an email address shown in FIG. 9.

(1) Security Condition Setting

The network manager establishes security conditions in the router 10a by describing which email addresses are eligible for each individual department. The router 10a accepts this request at its security condition definition unit 11. The security condition definition unit 11 enters specified security conditions to the security condition database 12. After that, the security condition definition unit 11 delivers the conditions to the security condition distributor 14. The security condition distributor 14 provides the registered security data to the next router 10b. The security condition distributor 14 in the receiving router 10b saves the received security conditions in its own security condition database 12. Similarly to the above, the router 10b propagates its own security conditions to its neighboring router 10a for registration.

(2) Security Condition Selection at User Terminal

Suppose that user Ua is to send his/her colleague, user Ub, an email message with a file attachment related solely to the customer support department. Before transmitting the file, the sending user Ua interacts with the security condition user interface 21 to specify a desired security condition. That is, the security condition user interface 21 first requests the router 10a to provide information about what security conditions the network allows.

Upon receipt of the above request, the security condition sender 15 in the router 10a retrieves security condition definition names and security condition IDs from the security condition database 12. The security condition sender 15 also consults the security condition data location definition unit 17 to obtain the information about in what format the security data is stored. The security condition sender 15 sends the retrieved information to the security condition user interface 21 in the requesting user terminal.

With the received information, the security condition user interface 21 in the requesting user terminal prompts the user to select his/her desired security condition. In the present example, the sending user Ua selects "Customer Support Department" since the intended destination user Ub in segment A belongs to that department. Upon selection, the security condition user interface 21 sets the selected security condition "Customer Support Department" by attaching its ID "0x0A01" to the file. After setting the security condition in an extended field of the compressed file header, the user terminal sends the router 10a a packet with an attachment containing the compressed file.

(3) Processing in Router

The packet received by the router 10a first goes to the routing processor. The routing processor has previously been configured with filtering parameters. This packet filter acts on Simple Mail Transfer Protocol (SMTP) packets in the present case, permitting each such packet to be directed to the packet parser 16.

FIG. 10 shows an overview of how an SMTP packet is parsed. As can be seen from FIG. 10, the packet parser 16 first consults the security condition data location definition unit 17 to identify the file format of a given IP packet, thus figuring out the location of a security condition ID in that packet. Since the attached file is MIME encoded, the security condition data location definition unit 17 commands the packet parser 16 to decode the file. The packet parser 16 then sends the packet decoder 18 a copy of the MIME packet.

The packet decoder 18 decodes the given MIME file, thereby extracting a security condition ID from the file of interest, as well as its specified destination email address. In the present context, it obtains a security condition ID "0x0A01" and a destination email address "bbb@ml.fujitsu.com." The obtained information goes to the packet parser 16, which then consults the security condition database 12 to determine whether the extracted packet destination satisfies the specified security condition.

The relevant entry of the security condition database 12 indicates that the security condition with an ID of "0x0A01" includes the email address "bbb@ml.fujitsu.com" in question as a permissible email address. This means that the file can be delivered to that address. The packet parser 16 thus sends the packet back to the routing processor, permitting delivery to its destination, user Ub. The destination user Ub receives the file through the router 10a. He/she can decompress the received file by using a commonly available archiver application.

The packet parser 16 discards the packet if that packet has a wrong destination address. Suppose, for example, that the sending user Ua has mistakenly specified the user Uc, instead of the intended user Ub, as a destination. This mistake produces a packet with a destination IP address of "ccc@ml.fujitsu.com." When the packet is received by the router 10, the packet decoder 18 decodes its MIME file attachment, thereby extracting a security condition ID "0x0A01" and a destination email address "bbb@ml.fujitsu.com" for further processing at the packet parser 16.

The packet parser 16 consults the security condition database 12 to determine whether the extracted packet destination satisfies the specified security condition. Since the security condition with an ID of "0x0A01" does not include "ccc@ml.fujitsu.com" as a permissible email address, the packet parser 16 discards the packet in question as being ineligible for file transfer.

Fifth Embodiment

Figure 11:
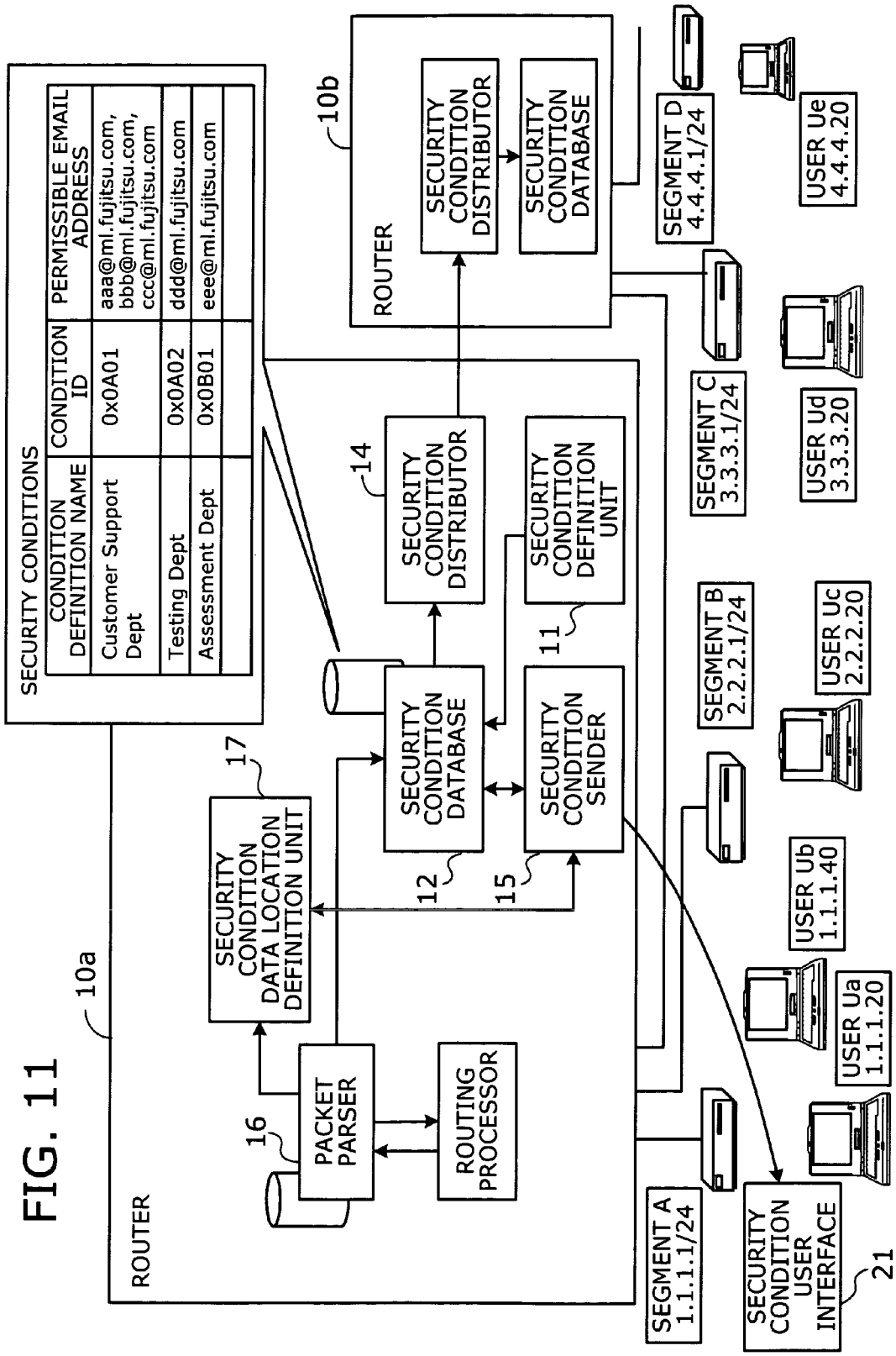
FIG. 11 shows an example network configuration according to a fifth embodiment of the invention.

Referring to FIGS. 11 and 12, this section will describe the operation of a router 10 according to a fifth embodiment of the invention. The fifth embodiment uses an X-field of an email header to add a security condition ID to each email message carrying files, so as to prevent information leakage on an individual email address basis.

FIG. 11 shows an example configuration of an enterprise LAN that is formed from a plurality of segments interconnected by routers. Specifically, two routers 10a and 10b divide the network into four segments A, B, C, and D. Each department member has an email address shown in FIG. 9.

(1) Security Condition Setting

The network manager defines security conditions in the same way as in the foregoing fourth embodiment.

(2) Security Condition Selection at User Terminal

It is now assumed that user Ua is to send his/her colleague, user Ub, an email message with a file attachment related solely to the customer support department. Before transmitting the file, the sending user Ua interacts with the security condition user interface 21 to specify a desired security condition. That is, the security condition user interface 21 first requests the router 10a to provide information about what security conditions the network allows.

Upon receipt of the above request, the security condition sender 15 in the router 10a retrieves security condition definition names and security condition IDs from the security condition database 12. The security condition sender 15 also consults the security condition data location definition unit 17 to obtain the information about in what format the security data is stored. The security condition sender 15 sends the retrieved information to the security condition user interface 21 in the requesting user terminal.

With the received information, the security condition user interface 21 in the requesting user terminal prompts the user to select his/her desired security condition. In the present example, the sending user Ua selects "Customer Support Department" since the intended destination user Ub in segment A is a member of that department. Upon selection, the security condition user interface 21 sets the selected security condition "Customer Support Department" by attaching its ID "0x0A01" to the file.

FIG. 12 shows an email header. As can be seen from FIG. 12, an X-field is used to store a security condition ID, where X-fields are user-definable part of an email header. More specifically, a new X-field named "X-securityID" is added the header to carry a specified security condition ID. The resulting packet with a security condition ID is sent from the sending user terminal to the router 10a.

(3) Processing in Router

The packet received by the router 10a first goes to the routing processor. The routing processor has previously been configured with filtering parameters. This packet filter acts on SMTP packets in the present case, permitting each such packet to be directed to the packet parser 16. The packet parser 16 first consults the security condition data location definition unit 17 to identify the file format of the given IP packet, thus figuring out the location of a security condition ID in that packet. That is, the packet parser 16 examines whether the given packet has an expected data structure that can accommodate a security condition ID. The router discards the packet if it does not have such a data structure.

If the packet in question has an expected format, the packet parser 16 extracts a security condition ID and a destination parameter from the packet. In the present context, it obtains a security condition ID "0x0A01" and a destination email address "bbb@ml.fujitsu.com." The packet parser 16 consults the security condition database 12 to determine whether the extracted packet destination satisfies the specified security condition. The relevant entry of the security condition database 12 indicates that the security condition with an ID of "0x0A01" includes the email address "bbb@ml.fujitsu.com" in question as a permissible address. This means that the file can be delivered to that address. The packet parser 16 thus sends the packet back to the routing processor, permitting delivery to its destination, user Ub. The destination user Ub receives the file through the router 10a. He/she can decompress the received file by using a commonly available archiver application.

The packet parser 16 discards the packet if that packet has a wrong destination address. Suppose, for example, that the sending user Ua has mistakenly specified user Uc, instead of the intended user Ub, as a destination. This mistake produces a packet with a destination IP address of "ccc@ml.fujitsu.com." The packet arrives at the router 10, where the packet parser 16 extracts its security condition ID "0x0A01" and destination email address "ccc@ml.fujitsu.com." The packet parser 16 then consults the security condition database 12 to determine whether the extracted packet destination satisfies the specified security condition. Since the security condition with an ID of "0x0A01" does not include "ccc@ml.fujitsu.com" as a permissible address, the packet parser 16 discards the packet in question as being ineligible for file transfer.

As can be seen from the above explanation, the fourth and fifth embodiments of the invention allow a network manager to use email addresses in establishing security conditions for checking files transmitted as email attachments, so as to prevent information from leaking as a result of a wrong destination address.

Conclusion

Various embodiments of the present invention have been described in the preceding sections. According to the invention, a security condition is specified for each file before it is transmitted to a router as FTP packets or an email attachment, and the receiving router examines the security condition in order not to deliver a file to unintended destinations in an enterprise LAN or other network environment formed from a plurality of segments. The router discards a packet if it contains a file whose destination is out of the range that the specified security condition allows. This feature prevents information from leaking even if the sender has accidentally specified a wrong destination address, thus enhancing the security in data communication.

More specifically, the communications system of the present invention employs a router that identifies packets produced by a file transfer application protocol. The sending user specifies a security condition ID and destination address of a file before he/she sends it out to the network. The router extracts such information from each received packet, thus determining whether the specified destination address of the file is allowed by a security condition corresponding the extracted security condition ID. If the address is found ineligible, the router discards the packet, thereby preventing the file content from leaking.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A communications system for transferring packets, comprising:

a router comprising:

a security condition definition unit receiving a set of security conditions, a security condition database storing the received security conditions, a packet parser that identifies and parses a packet produced by a file transfer application protocol, extracts from the packet a destination address and a security condition ID that a sending user has specified for a file contained in the packet, determines whether the extracted destination address satisfies the security condition corresponding to the user-specified security condition ID and, if not, discards the packet to prevent information leakage, and a domain data collector that makes access to a server managing network domains to collect domain data corresponding to a specified destination address; and a user terminal comprising:

a security condition user interface that requests the router to provide information about the security conditions and gives the security condition ID to the file to indicate which security condition the sending user has specified, (a) wherein:

when network segments do not vary, the security conditions each comprise a security condition ID and a permissible segment corresponding thereto, the permissible segment being defined as a collection of eligible destination addresses; and the packet parser determines whether the destination address of the file is included in the permissible segment corresponding to the security condition ID, so as to prevent information leakage on an individual segment basis, (b) wherein:

when the network segments vary dynamically, the security conditions each comprise a security condition ID and a permissible domain corresponding thereto, the permissible domain being defined as a collection of eligible destination domain names; and the packet parser determines whether the destination address of the file is included in the permissible domain corresponding to the specified security condition ID and, if not, notifies the domain data collector of the destination address, and determines again whether the destination address is included in the permissible domain that the domain data collector has obtained, thereby preventing information leakage on an individual domain basis.

2. The communications system according to claim 1, wherein:

the security conditions each comprise a security condition ID and a permissible segment group corresponding thereto, the permissible segment group being defined as a collection of eligible destination addresses; and the packet parser determines whether the destination address of the file is included in the permissible segment group corresponding to the given security condition ID, so as to prevent information leakage on an individual group basis.

3. The communications system according to claim 1, wherein:

the security condition user interface adds a security condition ID to a compressed file;

the router device further comprises a packet decoder that decompresses the compressed file attached to an email message before extracting and sending the security condition ID to the packet parser;

the security conditions each comprise a security condition ID and permissible email addresses eligible for being specified as a file destination; and the packet parser determines whether the destination address of the file is included in the permissible email addresses corresponding to the extracted security condition ID, so as to prevent information leakage on an individual email address basis.

4. The communications system according to claim 1, wherein:

the security condition user interface gives the security condition ID to a user-definable X-field as part of an email header;

the security conditions each comprise a security condition ID and permissible email addresses eligible for being specified as a file destination; and the packet parser determines whether the destination address of the file is included in the email addresses corresponding to the given security condition ID, so as to prevent information leakage on an individual email address basis.

5. The communications system according to claim 1, wherein the router further comprises a security condition distributor that provides other routers on the same network with a new security condition defined additionally in the router.

6. A method for preventing information from leaking during routing of packets over a network, the method comprising:

requesting, from a user terminal, a router to provide information about security conditions stored in that router;

adding a security condition ID to a file to indicate a security condition that a sending user has specified;

receiving a set of security conditions at the router;

storing the received security conditions in the router;

identifying and parsing a packet produced by a file transfer application protocol;

extracting from the packet a destination address and a security condition ID that a sending user has specified for a file contained in the packet;

determining whether the extracted destination address satisfies the security condition corresponding to the user-specified security condition ID; and discarding the packet to prevent information leakage, if the extracted destination address fails to satisfy the security condition;

(a) wherein:

when network segments do not vary, the security conditions each comprise a security condition ID and a permissible segment corresponding thereto, the permissible segment being defined as a collection of eligible destination addresses; and the determining step determines whether the destination address of the file is included in the permissible segment corresponding to the specified security condition ID, so as to prevent information leakage on an individual segment basis, (b) wherein:

when the network segments vary dynamically, the security conditions each comprise a security condition ID and a permissible domain corresponding thereto, the permissible domain being defined as a collection of eligible destination domain names; and said determining step comprises:

making access from the router to a server managing network domains to collect domain data corresponding to the extracted destination address if the destination address of the file is not included in the permissible domain corresponding to the specified security condition ID, and determining again whether the destination address is included in the collected domain data, so as to prevent information leakage on an individual domain basis.

7. The method according to claim 6, wherein:

the security conditions each comprise a security condition ID and a permissible segment group corresponding thereto, the permissible segment group being defined as a collection of eligible destination addresses; and the determining step determines whether the destination address of the file is included in the permissible segment group corresponding to the extracted security condition ID, so as to prevent information leakage on an individual group basis.

8. The method according to claim 6, wherein:

the file has been compressed and attached to an email message at the user terminal;

the adding step adds the security condition ID to the compressed file at the user terminal;

the extracting step comprises decompressing the compressed file attached the email message before extracting the security condition ID;

the security conditions each comprise a security condition ID and permissible email addresses eligible for being specified as a file destination; and the determining step determines whether the destination address of the file is included in the permissible email addresses corresponding to the extracted security condition ID, so as to prevent information leakage on an individual email address basis.

9. The method according to claim 6, wherein:

said adding step adds the security condition ID to a user-definable X-field as part of an email header;

the security conditions each comprise a security condition ID and permissible email addresses eligible for being specified as a file destination; and said determining step determines whether the destination address of the file is included in the permissible email addresses corresponding to the extracted security condition ID, so as to prevent information leakage on an individual email address basis.

10. The method according to claim 6, wherein the router provides other routers on the same network with an additional security condition newly defined in the router.

11. A router for forwarding packets, comprising:

a security condition definition unit receiving a set of security conditions, a security condition database storing the received security conditions, a packet parser that identifies and parses a packet produced by a file transfer application protocol, extracts from the packet a destination address and a security condition ID that a sending user has specified for a file contained in the packet, determines whether the extracted destination address satisfies the security condition corresponding to the user-specified security condition ID and, if not, discards the packet to prevent information leakage; and a domain data collector that makes access to a server managing network domains to collect domain data corresponding to a specified destination address, (a) wherein:

when network segments do not vary, the security conditions each comprise a security condition ID and a permissible segment corresponding thereto, the permissible segment being defined as a collection of eligible destination addresses; and the packet parser determines whether the destination address of the file is included in the permissible segment corresponding to the security condition ID, so as to prevent information leakage on an individual segment basis, (b) wherein:

when the network segments vary dynamically, the security conditions each comprise a security condition ID and a permissible domain corresponding thereto, the permissible domain being defined as a collection of eligible destination domain names; and the packet parser determines whether the destination address of the file is included in the permissible domain corresponding to the specified security condition ID and, if not, notifies the domain data collector of the destination address, and determines again whether the destination address is included in the permissible domain that the domain data collector has obtained, thereby preventing information leakage on an individual domain basis.

* * * * *